Jan. 25, 1944.    L. M. ELLISON    2,339,847
PRESSURE INDICATOR
Filed Oct. 2, 1941    4 Sheets-Sheet 1

Fig. 1

Inventor:
Lewis M. Ellison,
By Rummler Rummler & Davis
Attorneys.

Jan. 25, 1944.    L. M. ELLISON    2,339,847
PRESSURE INDICATOR
Filed Oct. 2, 1941    4 Sheets-Sheet 2
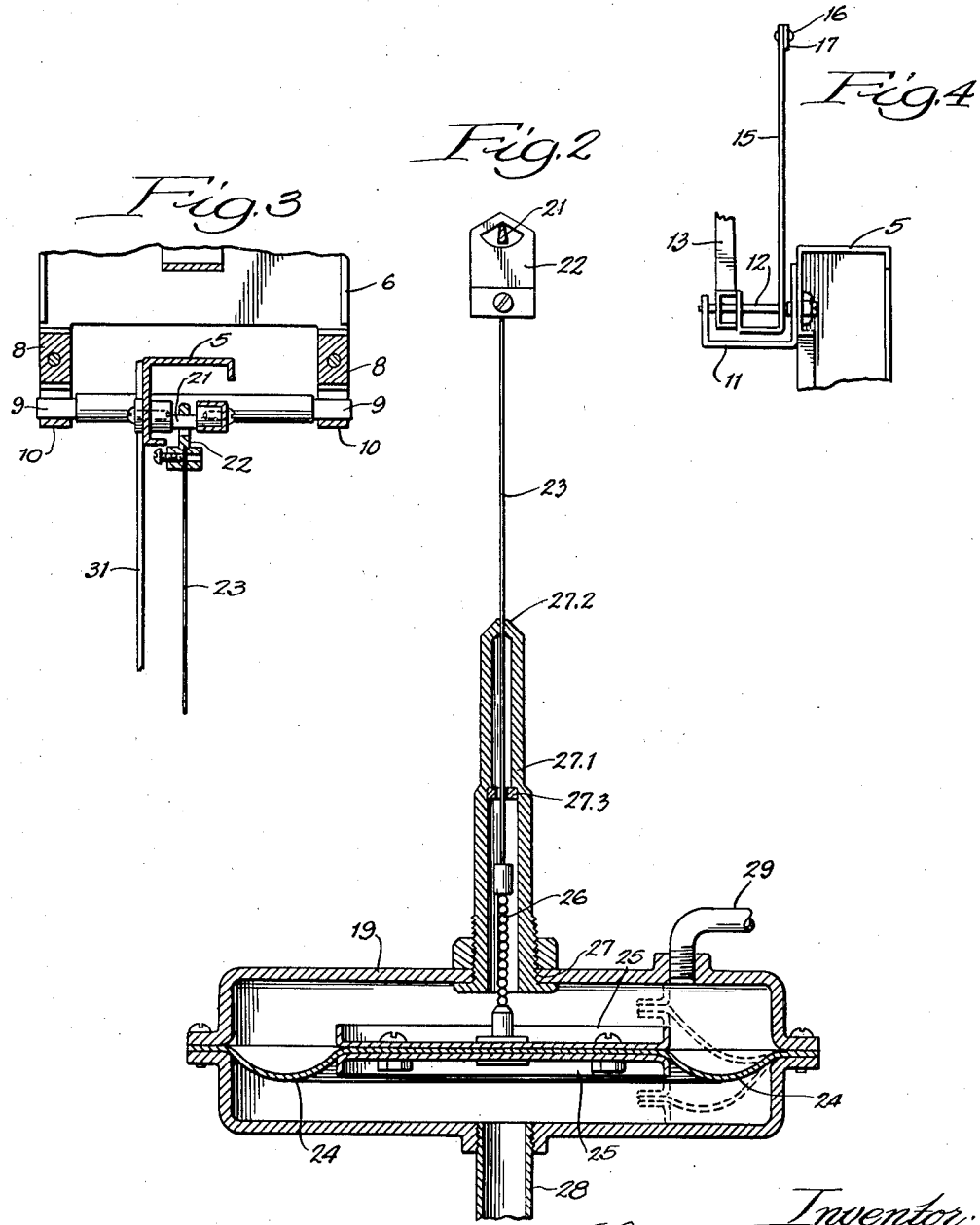
Inventor:
Lewis M. Ellison,
By Rummler Rummler & Davis,
Attorneys.

Jan. 25, 1944.    L. M. ELLISON    2,339,847
PRESSURE INDICATOR
Filed Oct. 2, 1941    4 Sheets-Sheet 3
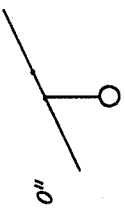

Jan. 25, 1944.  L. M. ELLISON  2,339,847
PRESSURE INDICATOR
Filed Oct. 2, 1941  4 Sheets-Sheet 4

Inventor:
Lewis M. Ellison,
By Rummler Rummler & Davis,
Attorneys.

Patented Jan. 25, 1944

2,339,847

UNITED STATES PATENT OFFICE 2,339,847

PRESSURE INDICATOR

Lewis M. Ellison, Chicago, Ill.

Application October 2, 1941, Serial No. 413,258

6 Claims. (Cl. 73—110)

This invention relates to improvements in straight-line pressure indicators of the type shown in my Patent No. 1,857,367, issued May 10, 1932, and particularly to such pressure indicators wherein the operating mechanism and motor mechanism are of such nature that the effective actuating force varies according to the position of the operating mechanism.

This invention has immediate application to pressure indicators operated by a diaphragm motor which type of motor has the inherent characteristic of varying its effective diaphragm area according to the disposition of the diaphragm under the influence of the primary actuating pressure.

The main objects of this invention are to provide a straight-line movement indicating-mechanism which will produce uniform scale readings when actuated by a motor in which the effective force produced by the motor is variable with respect to the primary actuating force; to provide a straight-line movement pressure indicator mechanism that will automatically compensate for variations in the effective actuating force, with respect to the primary actuating force, in order to produce uniform scale readings; to provide a diaphragm-motor operated, straight-line movement pressure indicator mechanism that will automatically compensate for variation of the effective diaphragm area as the same changes its position under the influence of the primary actuating pressure; to provide improved mechanism means whereby the movement of a diaphragm motor can be converted to straight-line indicator movement over a uniform scale range, and to provide a mechanism of this kind that will be simple and reliable in operation without the use of compensating cams or springs.

A specific embodiment of this invention is shown in the accompanying drawings in which:

Fig. 1 is a side elevation showing the operating mechanism of the improved indicator device, the casing being shown in section; and the diaphragm motor being of a form designed for negative pressure, and being partly in section;

Fig. 2 is a sectional view of the diaphragm motor modified so as to be suitable for a differential pressure gage;

Fig. 3 is a view as taken on line 3—3 of Fig. 1, showing the suspension arrangement for the operating lever of the mechanism;

Fig. 4 is a view taken on line 4—4 of Fig. 1, showing the mounting of the pointer arm on the operating lever;

Fig. 5 is a chart of diagrams and data illustrating the relative nature of the operating and correcting force, acting upon the indicator mechanism when the same is in operation;

Figure 6:
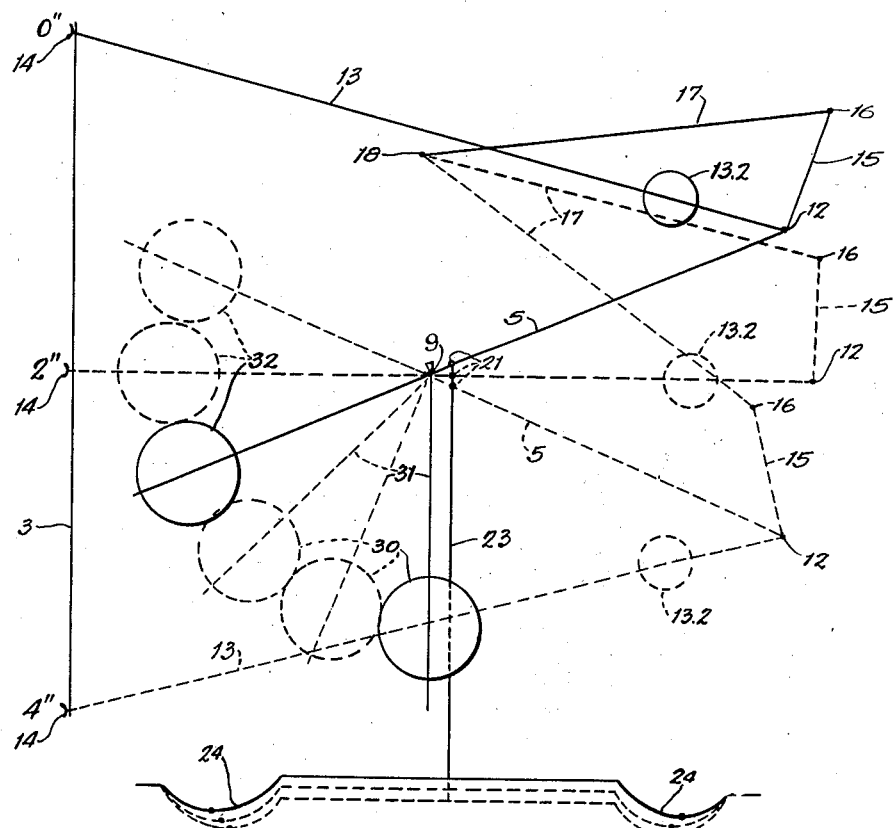
Fig. 6 is a diagram showing the relative positions of the links and levers for different positions of the pointer.

As shown in the drawings, the indicator mechanism is mounted in a casing 1 which constitutes the housing and a support for the mechanism. The front wall of the housing comprises a vertically extending side opening over which is secured a glass or other transparent plate 2 and through which a scale 3 may be seen. The scale 3 consists of a strip of any suitable material, preferably translucent, held vertically straight in a frame 4 suitably supported in the casing 1 to the rear of the glass plate 2. The scale 3 is graduated in accordance with any suitable system that will conform to the pressure conditions to be indicated by the device, and, as shown in my Patent No. 1,857,367, the scale graduations will be of uniform spacing.

The operating mechanism within the casing 1 is arranged to operate in a vertical plane to the rear of the scale 3 and comprises a main operating beam or lever 5 which is pivoted between its ends to the lower end of a somewhat inclined bracket 6 mounted on a supporting frame member 7 extending upwardly from the bottom of the casing 1. The lower end of the bracket 6 is arranged to provide a pair of spaced, depending bearings 8 between which the operating lever 5 extends and within which the ends of a pivot pin 9 are fulcrumed. The pivot pin 9 extends horizontally on opposite sides of the operating lever 5 and its ends are provided with knife edge bearings which engage in the bottom of a V-shaped channel 10 formed in each of the bearing members 8, so as to reduce operating friction and increase the sensitivity of the device.

The rear end of the operating lever 5 which extends some distance rearwardly of the pivot pin 9 is provided with a laterally extending bracket 11 in which is mounted a horizontal trunnion pin 12, and an indicator or pointer arm 13 has its rear end fastened to the pin 12 and extends forward therefrom to and past one of the side edges of the scale 3. The front end of the arm 13 carries a suitable pointer 14 arranged at right angles to the arm 13 and operating over the front of the scale 3 in the upward and downward movements of the arm 13 as will be hereafter described. The arm 13 is balanced by a counter-weight 13.1 and then overbalanced by an adjustable counterweight 13.2 whose function will be hereinafter explained.

A relatively short arm 15 is also fixed to the pin 12 and extends above the arm in substantially right angular bell crank relation to the indicator or pointer arm 13. The upper or free end of the short arm 15 is pivotally connected as at 16 with the rear or swinging end of a control link 17 which in turn has its forward or opposite end pivoted at 18 to the bracket 6. The pivot 18 is above and offset somewhat forwardly of the pivot 9 by which the lever 5 is connected with the lower end of said bracket.

As shown, the operating lever 5 is connected to a diaphragm motor 19 mounted at the lower part of the casing 1 and mounted on a supporting frame 7. Said connection is located rearwardly of the pivot pin 9 and comprises a horizontally disposed pin 21 mounted on the lever arm 5. The pin 21 is wedge-shaped to provide an upwardly extending knife edge bearing on which is hung a connector 22 having an inverted V-shaped eye through which the pin 21 extends. The connector 22 is fastened to the upper end of a vertical piano-wire rod 23 which in turn extends downwardly to a connection with the diaphragm of the diaphragm motor 19 as shown.

As shown, the diaphragm motor 19 comprises a horizontally split, rectangular casing between the halves of which is clamped the rim of the diaphragm 24 made of any suitable material, such as impervious silk. The central portion of the diaphragm 24 is clamped between a pair of plates 25, and the margins of the diaphragm 24, between the periphery of the plates 25 and the side walls of the casing 19, hang loosely with sufficient slack to follow the lines of a catenary curve for all positions of the diaphragm within the casing 19.

The diaphragm is connected to the lower end of the rod 23 by flexible means such as a fine ball-link chain 26. In the form shown in Fig. 1 this connection passes freely through the central opening 27 which is open to the air.

A pipe 28 extends through the lower wall of the diaphragm motor casing 19 for connection with a chamber in which negative or less than atmospheric pressure is to be measured and the upper wall of the diaphragm motor casing is provided with an opening 27 leading to atmosphere. The type of motor illustrated in Fig. 1 is that which is designed for actuation under negative or less than atmospheric pressure.

When the gage is to be used for measuring differential pressures, its diaphragm casing is modified as shown in Fig. 2. Here the opening 27 is closed by a tubular fitting 27.1 that surrounds and extends above the chain 26 and slidably fits the piano-wire rod 23 at its upper end 27.2. This fitting may also have a second less closely fitting guide 27.3. The space above the diaphragm may then be subjected to the higher pressure through a connection such as is shown at 29 while the connection 28 is subjected to the lower pressure.

When the gage is to be used for measuring positive or greater than atmospheric pressures, the pressure connection will be made at 29 and the casing will be exposed to atmosphere at 28.

To counter-balance the effective weight of the diaphragm and its connecting elements in its up and down movements in response to pressure within the diaphragm motor counter-weight 32 is placed in a suitable position. To counter-balance the primary actuating pressure exerted on the diaphragm, a gravity loading weight 30 is provided at the lower end of an arm 31 which is rigid with and depends from the operating lever 5 directly below the pivotal mounting 9. The weight 30 and the arm 31 provide a gravity loading means on the lever 5, which loading means is essentially in direct proportion to the primary force required to operate the lever 5. This loading means, by its position with respect to the lever 5, returns the lever 5 to a position with the pointer 14 on the arm 13 at zero position on the scale 3 when the pressures on each side of the diaphragm within the motor 19 are equal.

The counter-weight 32, adjustably mounted on the forward end of the operating lever 5 is also provided to counter-balance the lever 5 in zero position, and offset the weight of the indicator arm 13 and its right angle extension 15, together with the downward force or turning effect of these elements derived through their connection with the link 17.

The interconnecting linkage arrangement and pivoted mounting of the operating lever 5, the indicator arm 13, the short arm 15 and the link 17, as herein shown and described, are substantially like the arrangement disclosed in my Patent No. 1,857,367, and the primary purpose of the arrangement, as disclosed in the said patent, is to produce a straight-line movement of the indicator arm's pointer across the face of the flat vertically disposed scale 3.

However, when a diaphragm motor, or any motor device is employed, wherein the effective actuating force varies with respect to the primary actuating force producing the movement of the motor, the movement of the pointer 14 along the scale will not be uniformly proportional to the primary actuating force. As is known with diaphragm motors, the effective actuating force produced by the motor varies with respect to the primary actuating force, which is the force causing the diaphragm to move, in accordance with the position of the diaphragm with respect to the plane in which the rims of the diaphragm are clamped in the diaphragm motor.

This variation of the effective actuating force produced by the motor is due to the slack or loosely hung marginal areas of the diaphragm lying between the central clamping plates and the walls of the diaphragm casing, and for the reason that movement of the diaphragm up and down causes a shifting of the low point in the catenary-like curve that the slack portion of the diaphragm assumes. Thus, as the diaphragm moves downwardly from its medial position, the low point of the curve shifts inwardly and decreases the effective area of the diaphragm responsive to the primary actuating force; and conversely, as the diaphragm raises with respect to its medial position, the effective area of the diaphragm, responsive to the primary actuating pressure, is increased because the low point of the curve in the slack positions of the diaphragm moves outwardly toward the sides of the motor casing.

This results in a relatively large effective diaphragm area at the top position and a small effective diaphragm area at the bottom position. Therefore, the total force on the diaphragm, which is the effective delivered force, is larger at the top position than it would be if the diaphragm area were constant, and smaller at the bottom position than it would be if the diaphragm area were constant.

Therefore, in order to correct this variation of the effective delivered or actuating force produced by the diaphragm motor, to provide for uniform movement of the pointer in relation to variations of the primary actuating force or pressure, it is necessary that a variable compensating force be introduced into the indicator mechanism and that this compensating force be proportional to the change in effective area of the diaphragm and be of the proper direction. The present invention is particularly concerned with the introduction of this compensating force into the operating mechanism and with the automatic variation of this compensating force in accordance with the various operative positions of the mechanism.

In any normal, perfectly counter-balanced system, such as that illustrated in my Patent No. 1,857,367, it is necessary that the sum of all turning moments be zero. With respect to the straight-line movement indicating mechanism herein described, such a normal, perfectly counter-balanced system is graphically illustrated in Col. I of Fig. 5, in which only the main operating lever, the principal counter-weight and the actuating force are shown. The several positions of the operating lever and the gravity loading weight indicate the rotation of the system about the pivot P under the influence of a proportionately increasing actuating force F acting from the point A on the lever arm. Thus, with no actuating force, the gravity loading weight W hangs in a vertical position and the lever arm is at a position for zero indication on the scale. With a force $F_1$ acting from the point A on the main lever arm, the loading weight is shifted clock-wise sufficient to exactly balance the force $F_1$ and the main lever arm is moved about its pivot P to the position for indicating 1" on the scale. Similarly with forces $F_2$, $F_3$ and $F_4$ acting on the lever arm from the point A, the loading weight is shifted a sufficient angular distance in each case to exactly counter-balance the respective actuating force, and the lever arm is moved about the pivot P proportionately so as to indicate the several forces respectively on the scale, the scale divisions being uniformly spaced apart.

Thus, in a perfectly counter-balanced system and with a constant pressure area on which the primary actuating pressure exerts its influence, the forces $F_1$, $F_2$, $F_3$ and $F_4$ are proportional to the primary actuating pressures or forces and the uniform scale reads correctly at all pointer positions.

When, however, the factor of a variable effective actuating force, which varies relative to the primary actuating force, is imposed upon the system, it is necessary, in order to obtain uniform scale readings to provide a plus or minus variable force or its equivalent, in addition to the working balance, to compensate for the variations of the effective actuating force as they occur. Thus, in a system employing a diaphragm motor, as herein illustrated, it is necessary to furnish a variable additional increment of force to compensate for the increase and decrease in the effective actuating force resulting from the increase and decrease of effective diaphragm area relative to the area obtained at the medial position of the diaphragm.

Assuming that the medial position of the diaphragm is at the point where the indicator mechanism is positioned to give a middle reading of 2" on a 4" scale, the extra or compensating force needed to compensate for diaphragm area variation is graphically illustrated in column II of Fig. 5, wherein the extra or compensated force $EF_2$ at the medial position of the diaphragm is zero for the 2" reading on the scale and is proportionately plus or minus as the diaphragm moves toward the bottom or top positions, respectively, in the motor, the top position being zero reading on the scale.

In the process of securing this compensating force on to the operating lever arm, changes in the loading of certain parts are made which introduce additional forces and brings about the variable constituent of the forces which compensate for the variation of the effective area of the diaphragm.

In the apparatus herein shown and described, the principal, variable, compensating force is obtained by over-balancing the indicator arm 13 in a counterclockwise direction; and in the present instance, this is accomplished by the added counter-weight 13.2 on the pointer arm. The amount of overbalancing weight in any case will be determined by the type and size of the diaphragm motor used. Because of the small arm 15 which is fixed in its bell crank relation to the indicator arm 13 and the pivoted connection of the small arm 15 with the pivoted link 17, this overbalancing of the pointer arm 13 results in a varying distribution of forces at the pointer arm pivot point 12 on the operating lever 5, such that a plus and minus increment of vertical force is had at the pivot point 12, according to whether the angle between link 17 and arm 15, at the pivot 16 is greater than or less than a right angle.

This overbalancing of the indicator arm results in forces on pin 12 which can be considered as being composed of two parts. The first part is a variable force whose magnitude and direction are functions of the position of arm 17 with respect to the weighted bell crank lever 13, 15, which in turn is dependent on the position of the diaphragm. If arm 17 meets the arm 15 at an acute angle, there will be an upward (negative) component of force at pin 12. If arm 17 meets the arm 15 at an obtuse angle, there will be a downward (positive) component of force at pin 12. If arm 17 meets arm 15 at right angles, there will be no downward or upward component. The second part or force is a constant additional force on beam 5 due to the change in dead weight of the pointer system.

Essentially, the straight-line motion guiding members constitute a linkage system consisting of two fixed pivotal points 18 and 9 and two movable pivotal points 16 and 12, with a fixed member 13 extending out perpendicularly from the member 15 which connects the movable pivotal points 16 and 12. The operation of this system will be best understood from Fig. 6 where its essentials are illustrated diagrammatically, being shown by full lines in the position which corresponds with the zero indication of the pointer, and by dotted lines in the two positions corresponding to the middle position of the pointer on the scale and the extreme lower position of the pointer on the scale.

In the present invention the torque moment of the weighted bell crank arm 13 about pivot 12 is appreciably greater than the torque moment of the gravity loading weight 30 about the pivot 9. Hence, the bell crank arm 15 is subject to a definite counterclockwise torque, since the linkage consists of a system of two fixed and two pivotal points. The effect of this counterclockwise torque on the arm 15 is dependent on the angular relation between this arm and the other members of this system. This angular relation is, in turn, dependent on the movement of the actuating diaphragm 24 of the gage. For positions where the angle at 16 is less than a right angle, the effect of the counterclockwise torque on arm 15 results in forces which move or tend to move the free pivotal points 16 and 12 in an upward direction. When the angle at 16 is substantially a right angle, the counterclockwise torque has no effect. When the angle at 16 is greater than a right angle, the resultant motion of arm 15 is downward. If the system is restrained from moving, the tendency to move may be represented as a force in the direction of possible motion.

Hence, in a system constructed according to this invention as illustrated in Fig. 6, as the pointer moves from zero to maximum scale deflection and the linkage angle 16 changes from an acute angle through a right angle to an obtuse angle, the bell crank and linkage introduce a force on the main beam 5 which first opposes the pull of the diaphragm and decreases from a maximum in an upward direction down to zero at the right angle position of the linkage at 16, and thereafter augments the downward pull of the diaphragm. Thus, a force increment is secured which varies with the position of the actuating motor diaphragm. Such a force is also represented graphically in column III of Fig. 5.

The variable component is shown in column III of Fig. 5. The magnitude of the forces is dependent on the degree of overbalance. The direction of the forces is dependent on the position of arm 17.

The fixed component due to the change in dead weight can be compensated for by a shift in the counter-weight 32. This counter-weight 32 can further be used to shift the zero point of the variable force to any desired position by adding a fixed uniform force such as for example that illustrated in column IV of Fig. 5.

In the graphic illustration of Fig. 5, the fixed, restoring force is indicated to have a value of two units, which units are arbitrarily chosen purely for illustrative purposes. Due to the fact that the operating lever 5 swings only a relatively short angular distance on either side of the horizontal during its operative movement, the arcuate swinging of the counter-weight 32, because of its harmonic relation with the rest of the system, produces only a negligible variation in the resultant effect of the weight as a substantially constant restoring force.

It will now be apparent that the resultant, total correcting force imposed upon the herein described system of indicator mechanism is the sum of the extra or variable compensating force needed to compensate for diaphragm area variations and the added or restoring force required to restore the gross counter-balance or zero point of the system. This sum of forces or the required total correcting force which must be added to the effective actuating force produced by the diaphragm motor, is graphically illustrated in column V of Fig. 5. From this illustration of Fig. 5, it will be seen that the total required correcting force to compensate for the change in effective area of the actuating diaphragm has been obtained by the simple addition of one variable and one fixed force.

Thus, it will now be seen that in acordance with my invention, inherent variations in the effective actuating force of a diaphragm motor during the course of its operation are compensated by first providing a plus or minus variable force, which is proportionate to variations of the effective actuating force, in addition to the working balance of the system of indicator mechanism; and then adding to the gross counterbalance of the system, a constant force of such magnitude that the sum of the constant additional force and the variable force will result in a total compensating force sufficient to satisfy the required conditions for producing uniform scale readings or movement of the pointer throughout its entire range of movement. As has been shown, the first step of securing a gradually increasing increment of force to compensate for variations of the effective actuating force as the diaphragm moves from one extreme to the other, is accomplished in the apparatus herein shown by over-balancing the indicator arm 13 of the straight-line movement mechanism, whereby, because of the linkage arrangement by which straight-line movement of the pointer is obtained, the desired increment of compensating force for all positions of the diaphragm and hence, of the operating lever 5, is had.

The second step of providing an addition to the gross counter-balance of the system is accomplished by means of adjustment of the counter-weight 32.

In the apparatus of the present disclosure, the object is to provide a simple mechanism to furnish the additional increment of force necessary to compensate for the variation in effective actuating force resulting from variations of the disposition of the diaphragm surface. It will be understood, however, that the added increment of compensating force may be obtained by a wide variety of additional force applied to the main operating lever 5.

The main advantages of my invention reside in the fact that with a simple straight-line movement mechanism, a diaphragm type of motor or primary actuating device may be employed without upsetting the otherwise uniformly proportional movement of the pointer across the face of a flat scale having uniformly spaced graduations. Other advantages reside in the simplicity of the mechanism employed, whereby greater accuracy is obtained and whereby a longer operating life for the mechanism is provided.

Although but one specific embodiment of this invention is herein shown and described, it will be understood that details of the construction shown may be altered or omitted without departing from the spirit of this invention as defined by the following claims.

I claim:

1. A pressure indicator, comprising a balance beam, a straight scale dial, a pointer adjacent said scale dial, a pivoted pointer arm and linkage actuated by said beam for producing straight-line movement of said pointer proportionate to the angular movement of said beam, a diaphragm arranged to be exposed to pressures to be measured and connected to said beam, said diaphragm being of a type whose effective area varies as it moves under pressure, and counter-weighting means mounted on said pointer arm and acting on said beam to vary the movement of the beam in compensating relation to the variation of effective area of the diaphragm to produce uniform angular movements of the beam for uniform changes of pressure on the diaphragm.

2. In a diaphragm actuated pressure indicator with a uniformly graduated scale dial and in which the diaphragm has a varying rate of travel at different pressures, a balance beam connected to said diaphragm for tilting movement, a bell crank lever pivoted on said beam on an axis parallel with the axis of said beam and having a vertically disposed arm and a horizontally disposed arm, a guide link connecting said vertically disposed arm with a stationary axis spaced from and parallel with the axis of said beam, and an adjustable weight on said horizontally disposed arm positioned to coact with said link to vary the angular movement of said beam in compensating relation to the varying rates of motion of said diaphragm under changes of pressure thereon.

3. In a diaphragm actuated pressure indicator with a uniformly graduated scale dial and in which the diaphragm has a varying rate of travel at different pressures, a balance beam connected to said diaphragm for tilting movement, a bell crank lever pivoted on said beam on an axis parallel with the axis of said beam and having a vertically disposed arm and a horizontally disposed arm, a guide link connecting said vertically disposed arm with a stationary axis spaced from and parallel with the axis of said beam, and a weight on said horizontally disposed arm shiftable with respect to the beam by movement of said arm, said link being in such angular relation to said vertically disposed arm as to apply a turning movement to the beam through the pull of said weight in compensating relation to the varying rates of movement of said diaphragm under pressure changes.

4. In an indicator, a balance beam, an indicator scale having uniformly spaced graduations, a pointer cooperating with said scale to indicate pressures, a diaphragm connected to said beam for tilting it and having a characteristic varying deviation from uniform movement under uniform pressure changes, mechanism interposed between said beam and pointer to indicate the movements of said beam on said scale, said mechanism comprising a bell crank pivoted on said beam and having a weighted arm, and a link connecting said bell crank to a stationary axis to vary the effect of said weighted bell crank arm on said beam so as to compensate for the deviation of said diaphragm from uniform movement.

5. In an indicator having a diaphragm which moves with changing degrees of travel per successive unit of pressure change, an indicator mechanism, comprising a beam connected to said diaphragm and loaded for a substantially uniform rate of movement per unit of travel of the diaphragm, a bell crank pivoted on said beam, one arm of said bell crank supporting a counterweight, a link pivoted to another arm of said bell crank and to a remote stationary axis for shifting said counterweight through the movement of said beam, and said link being disposed so as to vary the effect of said counterweight on the movement of the beam in compensating relation to the varying influence of said diaphragm on such movement.

6. In an indicator, a balance beam fulcrumed on a stationary horizontal axis, a link pivoted on a stationary horizontal axis spaced from and parallel with the axis of said beam, a cross arm pivoted to said beam and to said link, a counterweighted arm in bell crank relation to said cross arm with respect to one of its said pivots to apply a varying force to the beam, a diaphragm positioned and connected to swing said balance beam through changes in pressure on said diaphragm, said diaphragm being of a type that changes its effective area as it moves under pressure thereon, and said link, beam and bell crank arms being proportioned, counterweighted and disposed to produce uniform angular movement of said beam for successive unitary changes of pressure on said diaphragm.

LEWIS M. ELLISON.